US012561132B2

(12) United States Patent
Dhokane et al.

(10) Patent No.: US 12,561,132 B2
(45) Date of Patent: Feb. 24, 2026

(54) SYSTEM AND METHOD FOR SELF-ADJUSTING ROBOTIC BUILD INFRASTRUCTURE FOR SOFTWARE APPLICATION DEVELOPMENT

(71) Applicant: BANK OF AMERICA CORPORATION, Charlotte, NC (US)

(72) Inventors: Deepak Suresh Dhokane, Maharashtra (IN); Debraj Goswami, Telangana (IN); Satish S. Kekane, Maharashtra (IN); Mohan Kishore Kolli, McKinney, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 221 days.

(21) Appl. No.: 18/225,211

(22) Filed: Jul. 24, 2023

(65) Prior Publication Data

US 2025/0036398 A1     Jan. 30, 2025

(51) Int. Cl.
*G06F 8/71* (2018.01)
*G06F 11/3668* (2025.01)

(52) U.S. Cl.
CPC ............ *G06F 8/71* (2013.01); *G06F 11/3684* (2013.01); *G06F 11/3688* (2013.01)

(58) Field of Classification Search
None
See application file for complete search history.

(56) References Cited

U.S. PATENT DOCUMENTS 7,051,092 B2     5/2006  Lenz et al.
7,437,614 B2     10/2008  Haswell et al.
8,583,650 B2     11/2013  Fellenstein et al.
8,850,267 B2     9/2014  Aggarwal et al.
9,239,764 B2     1/2016  Howarth
9,336,060 B2     5/2016  Nori et al.

(Continued)

OTHER PUBLICATIONS

Bouchaala, "Dynamic Configuration Management in Distributed Systems", https://ghaidabouchala.medium.com/dynamic-configuration-management-in-distributed-systems-part-1-3218b8317b68 (Year: 2021).*

(Continued)

*Primary Examiner* — Hossain M Morshed

(74) *Attorney, Agent, or Firm* — Moore & Van Allen PLLC; Nicholas C. Russell

(57)     ABSTRACT

Systems, computer program products, and methods are described herein for self-adjusting robotic build infrastructure for software application development. The present disclosure is configured to receive a set of input parameters associated with the planned build; analyze the set of input parameters associated with the planned build; determine a robotic build infrastructure from a robotic build infrastructure database using the analyzed set of input parameters associated with the planned build; compile an image test of the planned build based on the robotic build infrastructure determined from the robotic build infrastructure database; validate the image test through a performance test; adjust the image test based on the analyzed set of input parameters and the performance test validation; initiate a final build of the robotic build infrastructure based on the adjusted image test; and certify the final build of the adjusted robotic build infrastructure.

20 Claims, 7 Drawing Sheets

(56) References Cited

U.S. PATENT DOCUMENTS

| | | | | |
|---|---|---|---|---|
| 10,261,776 | B2* | 4/2019 | Scheidel | ................... G06F 8/61 |
| 10,324,690 | B2 | 6/2019 | Quali | |
| 10,528,454 | B1 | 1/2020 | Baraty et al. | |
| 10,545,756 | B1* | 1/2020 | Huang | ...................... G06F 8/71 |
| 10,884,732 | B1* | 1/2021 | Zolotow | ................... G06F 8/76 |
| 11,366,683 | B2* | 6/2022 | Wang | ..................... G06F 9/455 |
| 11,416,276 | B2 | 8/2022 | Siegmund | |
| 11,550,704 | B2 | 1/2023 | Canter | |
| 2012/0131567 | A1* | 5/2012 | Barros | ................. G06F 9/5088 |
| | | | | 717/170 |
| 2016/0077820 | A1* | 3/2016 | Bergen | ...................... G06F 8/61 |
| | | | | 717/176 |
| 2017/0269921 | A1* | 9/2017 | Martin Vicente | ... G06F 11/3668 |
| 2018/0276019 | A1* | 9/2018 | Ali | ...................... G06F 11/1469 |
| 2019/0294528 | A1* | 9/2019 | Avisror | .............. G06F 11/3698 |
| 2021/0157775 | A1* | 5/2021 | Pickerill | ................... G06F 8/76 |
| 2022/0244922 | A1 | 8/2022 | Puggal et al. | |
| 2022/0269497 | A1* | 8/2022 | Jonna | ........................ G06F 8/71 |
| 2023/0035600 | A1* | 2/2023 | Holzman | ................. G06F 8/71 |
| 2023/0118065 | A1* | 4/2023 | Kumar | ............... G06F 21/6218 |
| | | | | 717/124 |
| 2023/0126059 | A1* | 4/2023 | Stumm | .................... G06F 8/10 |
| | | | | 717/101 |

OTHER PUBLICATIONS

Kramer, "Dynamic Configuration for Distributed Systems", 1985, IEEE (Year: 1985).*
Sandobalin, "An Infrastructure Modelling Tool for cloud provisioning", 2017, IEEE (Year: 2017).*

* cited by examiner

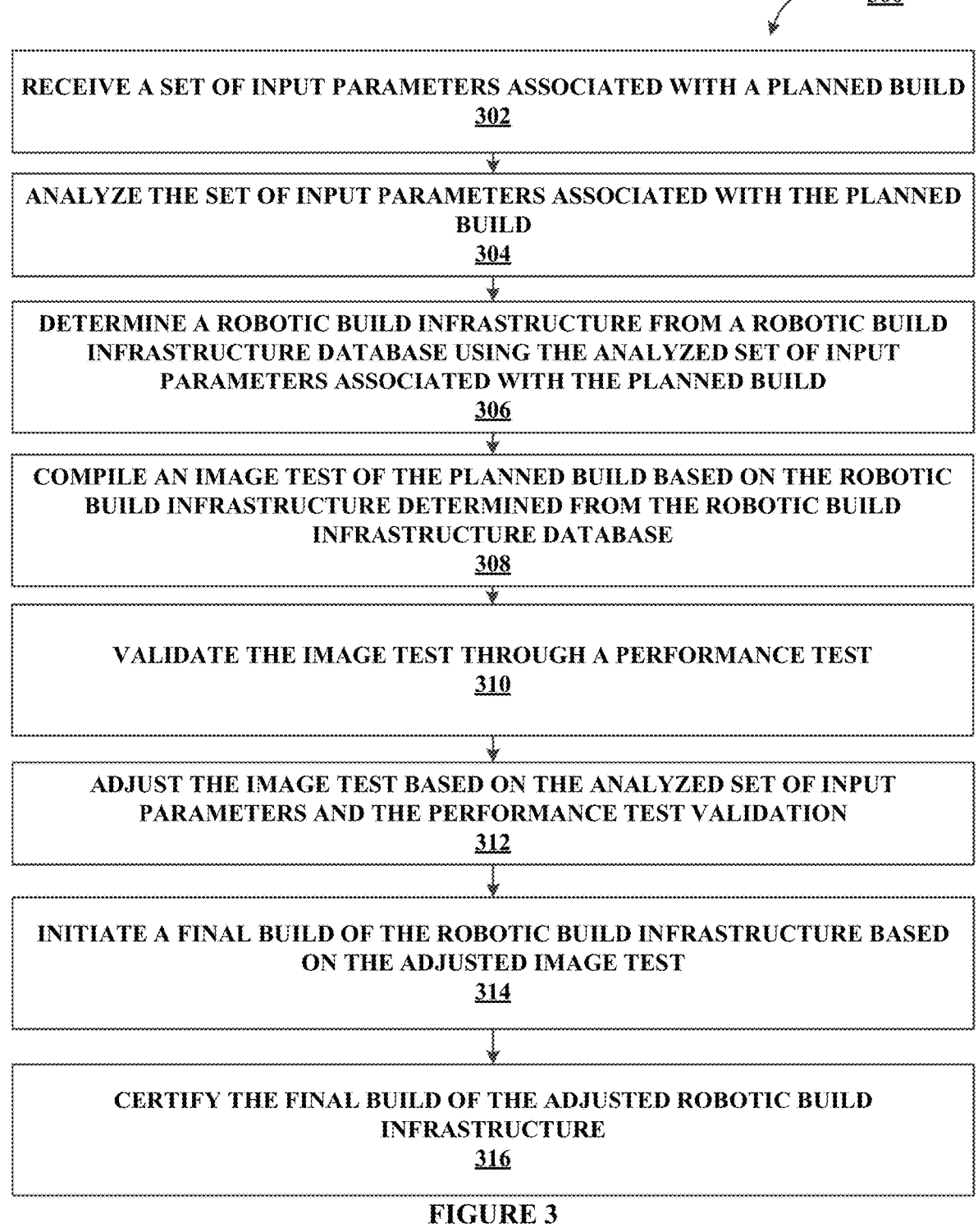

_300_

RECEIVE A SET OF INPUT PARAMETERS ASSOCIATED WITH A PLANNED BUILD
302

ANALYZE THE SET OF INPUT PARAMETERS ASSOCIATED WITH THE PLANNED BUILD
304

DETERMINE A ROBOTIC BUILD INFRASTRUCTURE FROM A ROBOTIC BUILD INFRASTRUCTURE DATABASE USING THE ANALYZED SET OF INPUT PARAMETERS ASSOCIATED WITH THE PLANNED BUILD
306

COMPILE AN IMAGE TEST OF THE PLANNED BUILD BASED ON THE ROBOTIC BUILD INFRASTRUCTURE DETERMINED FROM THE ROBOTIC BUILD INFRASTRUCTURE DATABASE
308

VALIDATE THE IMAGE TEST THROUGH A PERFORMANCE TEST
310

ADJUST THE IMAGE TEST BASED ON THE ANALYZED SET OF INPUT PARAMETERS AND THE PERFORMANCE TEST VALIDATION
312

INITIATE A FINAL BUILD OF THE ROBOTIC BUILD INFRASTRUCTURE BASED ON THE ADJUSTED IMAGE TEST
314

CERTIFY THE FINAL BUILD OF THE ADJUSTED ROBOTIC BUILD INFRASTRUCTURE
316

FIGURE 3

SYSTEM AND METHOD FOR SELF-ADJUSTING ROBOTIC BUILD INFRASTRUCTURE FOR SOFTWARE APPLICATION DEVELOPMENT

TECHNOLOGICAL FIELD

Example embodiments of the present disclosure relate to self-adjusting robotic build infrastructure for software application development.

BACKGROUND

Significant amounts of resources, time, and human intervention are associated with the provisioning and installation of new robotic infrastructure. Automated builds based on a factory model have experienced difficulty in scaling to a specific environment.

Applicant has identified a number of deficiencies and problems associated with self-adjusting robotic build infrastructure for software application development. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for self-adjusting robotic build infrastructure for software application development.

In one aspect, a system for self-adjusting robotic build infrastructure for software application development is provided. In some embodiments, the system may comprise: a memory device with computer-readable program code stored thereon; at least one processing device operatively coupled to the at least one memory device and the at least one communication device, wherein executing the computer-readable code is configured to cause the at least one processing device to: receive a set of input parameters associated with a planned build; analyze the set of input parameters associated with the planned build; determine a robotic build infrastructure from a build infrastructure database using the analyzed set of input parameters associated with the planned build; compile an image test of the planned build based on the robotic build infrastructure determined from the robotic build infrastructure database; validate the image test through a performance test; adjust the image test based on the analyzed set of input parameters and the performance test validation; initiate a final build of the robotic build infrastructure based on the adjusted image test; and certify the final build of the adjusted robotic build infrastructure.

In some embodiments, determination of the robotic build infrastructure from the robotic build infrastructure database includes: compare the analyzed set of input parameters against a standards information base; define a set of compliance guidelines through a governance module, compare the analyzed set of input parameters against the robotic build infrastructure database; and select the robotic build infrastructure from the robotic build infrastructure database using a plurality of advanced computational models for data analysis and automated decision making, comparisons of the standards information base, and the set of compliance guidelines defined by the governance module.

In some embodiments, validating the image test includes performing regressive validation on the image test.

In some embodiments, adjusting the image test includes: define a set of performance criteria based on the analyzed set of input parameters associated with the planned build; load a test case scenario from a test case repository; execute the test case scenario; and analyze the set of performance criteria resulting from the test case scenario.

In some embodiments, adjusting the image test includes: transmit a request to an end user to revise the test image based on a test iteration; revise the test image upon receipt of approval from the end user to revise the test image based on the test iteration; and generate an adjusted image test through a plurality of advanced computation models for data analysis and automated decision making.

In some embodiments, initiating a final build includes storing the adjusted image test within the robotic build infrastructure database.

In some embodiments, initiating the final build includes balancing a local traffic management (LTM) and a global traffic management (GTM).

In another aspect, a computer program product for self-adjusting robotic build infrastructure for software application development, the computer program product comprising at least one non-transitory computer-readable medium having computer-readable program code portions embodied therein, the computer-readable program code portions comprising: an executable portion configured to receive a set of input parameters associated with a planned build; analyze the set of input parameters associated with the planned build; an executable portion configured to determine a robotic build infrastructure from a build infrastructure database using the analyzed set of input parameters associated with the planned build; an executable portion configured to compile an image test of the planned build based on the robotic build infrastructure determined from the robotic build infrastructure database; an executable portion configured to validate the image test through a performance test; an executable portion configured to adjust the image test based on the analyzed set of input parameters and the performance test validation; initiate a final build of the robotic build infrastructure based on the adjusted image test; and an executable portion configured to certify the final build of the adjusted robotic build infrastructure.

In some embodiments, determination of the robotic build infrastructure from the robotic build infrastructure database includes: compare the analyzed set of input parameters against a standards information base; define a set of compliance guidelines through a governance module, compare the analyzed set of input parameters against the robotic build infrastructure database; and select the robotic build infrastructure from the robotic build infrastructure database using a plurality of advanced computational models for data analysis and automated decision making, comparisons of the standards information base, and the set of compliance guidelines defined by the governance module.

In some embodiments, validating the image test includes performing regressive validation on the image test.

In some embodiments, adjusting the image test includes: define a set of performance criteria based on the analyzed set of input parameters associated with the planned build; load a test case scenario from a test case repository; execute the test case scenario; and analyze the set of performance criteria resulting from the test case scenario.

In some embodiments, adjusting the image test includes: transmit a request to an end user to revise the test image based on a test iteration; revise the test image upon receipt of approval from the end user to revise the test image based on the test iteration; and generate an adjusted image test through a plurality of advanced computation models for data analysis and automated decision making.

In some embodiments, initiating a final build includes storing the adjusted image test within the robotic build infrastructure database.

In some embodiments, initiating the final build includes balancing a local traffic management (LTM) and a global traffic management (GTM).

In one aspect, a method for self-adjusting robotic build infrastructure for software application development, the method including: receiving a set of input parameters associated with a planned build; analyzing the set of input parameters associated with the planned build; determining a robotic build infrastructure from a build infrastructure database using the analyzed set of input parameters associated with the planned build; compiling an image test of the planned build based on the robotic build infrastructure determined from the robotic build infrastructure database; validating the image test through a performance test; adjusting the image test based on the analyzed set of input parameters and the performance test validation; initiating a final build of the robotic build infrastructure based on the adjusted image test; and certifying the final build of the adjusted robotic build infrastructure.

In some embodiments the method includes, determination of the robotic build infrastructure from the robotic build infrastructure database includes: compare the analyzed set of input parameters against a standards information base; define a set of compliance guidelines through a governance module, compare the analyzed set of input parameters against the robotic build infrastructure database; and select the robotic build infrastructure from the robotic build infrastructure database using a plurality of advanced computational models for data analysis and automated decision making, comparisons of the standards information base, and the set of compliance guidelines defined by the governance module.

In some embodiments the method includes, validating the image test includes performing regressive validation on the image test.

In some embodiments the method includes, adjusting the image test includes: define a set of performance criteria based on the analyzed set of input parameters associated with the planned build; load a test case scenario from a test case repository; execute the test case scenario; and analyze the set of performance criteria resulting from the test case scenario.

In some embodiments the method includes, adjusting the image test includes: transmit a request to an end user to revise the test image based on a test iteration; revise the test image upon receipt of approval from the end user to revise the test image based on the test iteration; and generate an adjusted image test through a plurality of advanced computation models for data analysis and automated decision making.

In some embodiments the method includes, initiating a final build includes storing the adjusted image test within the robotic build infrastructure database.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
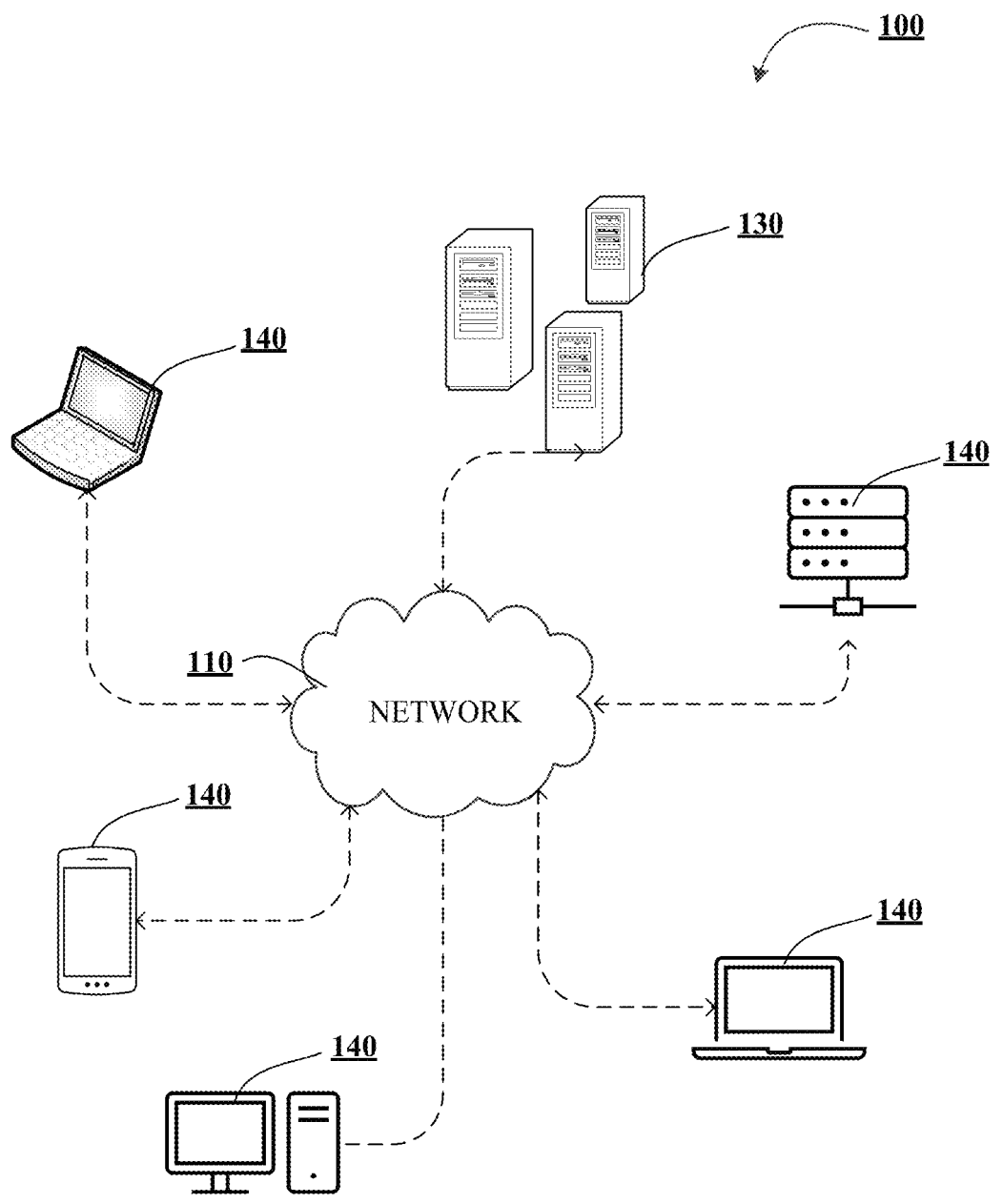
Figure 1B:
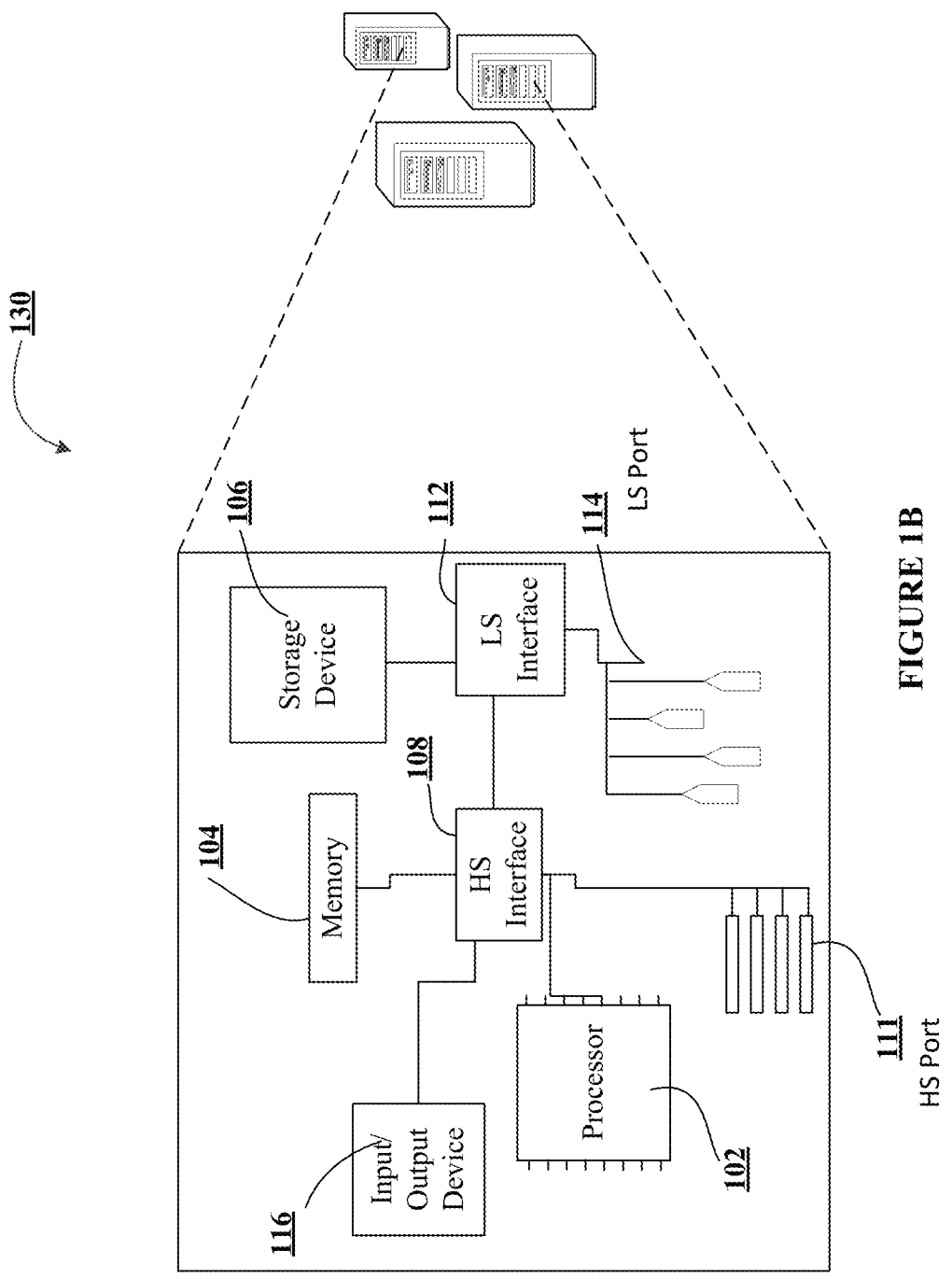
Figure 1C:
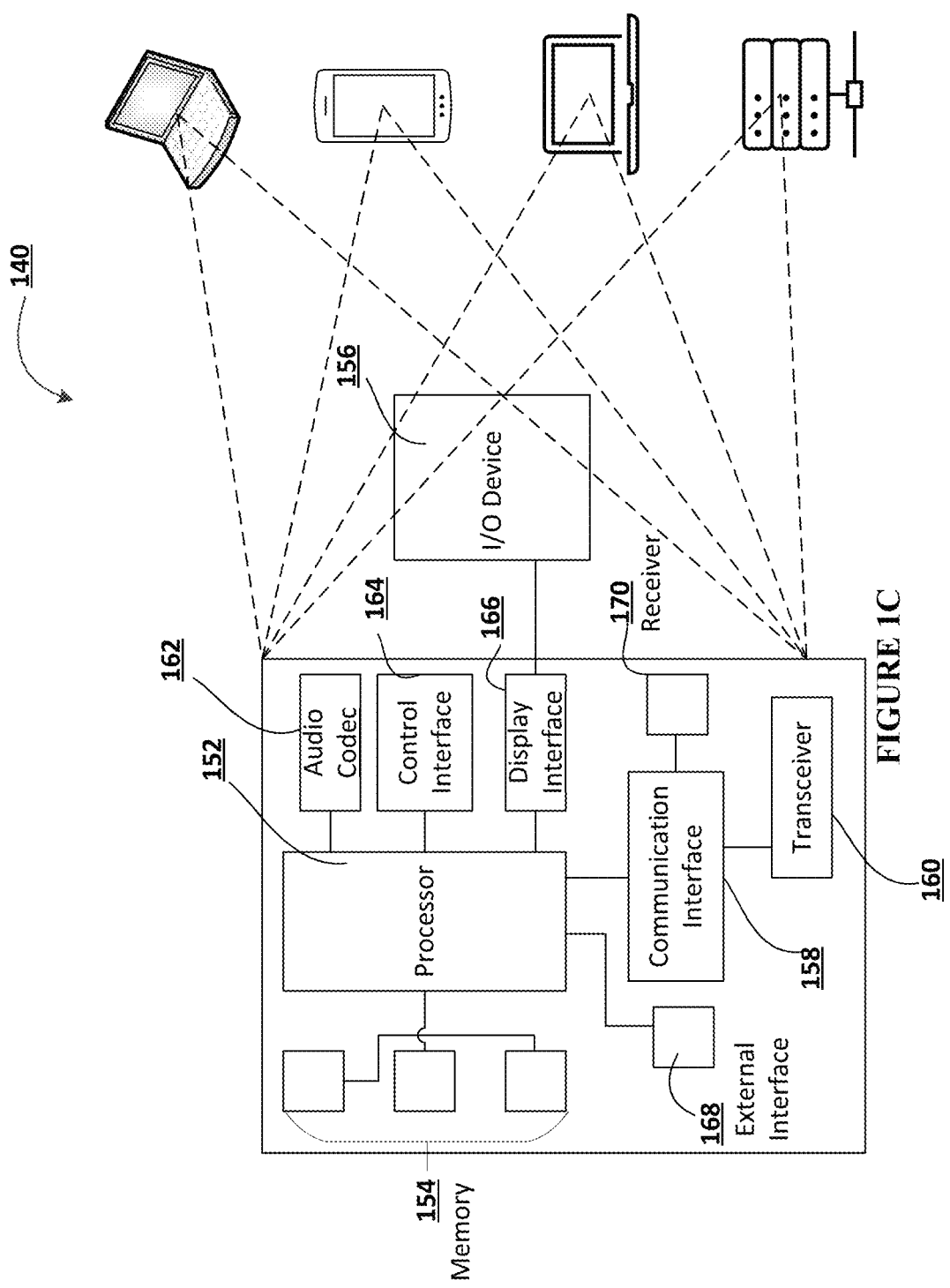
Figure 2:
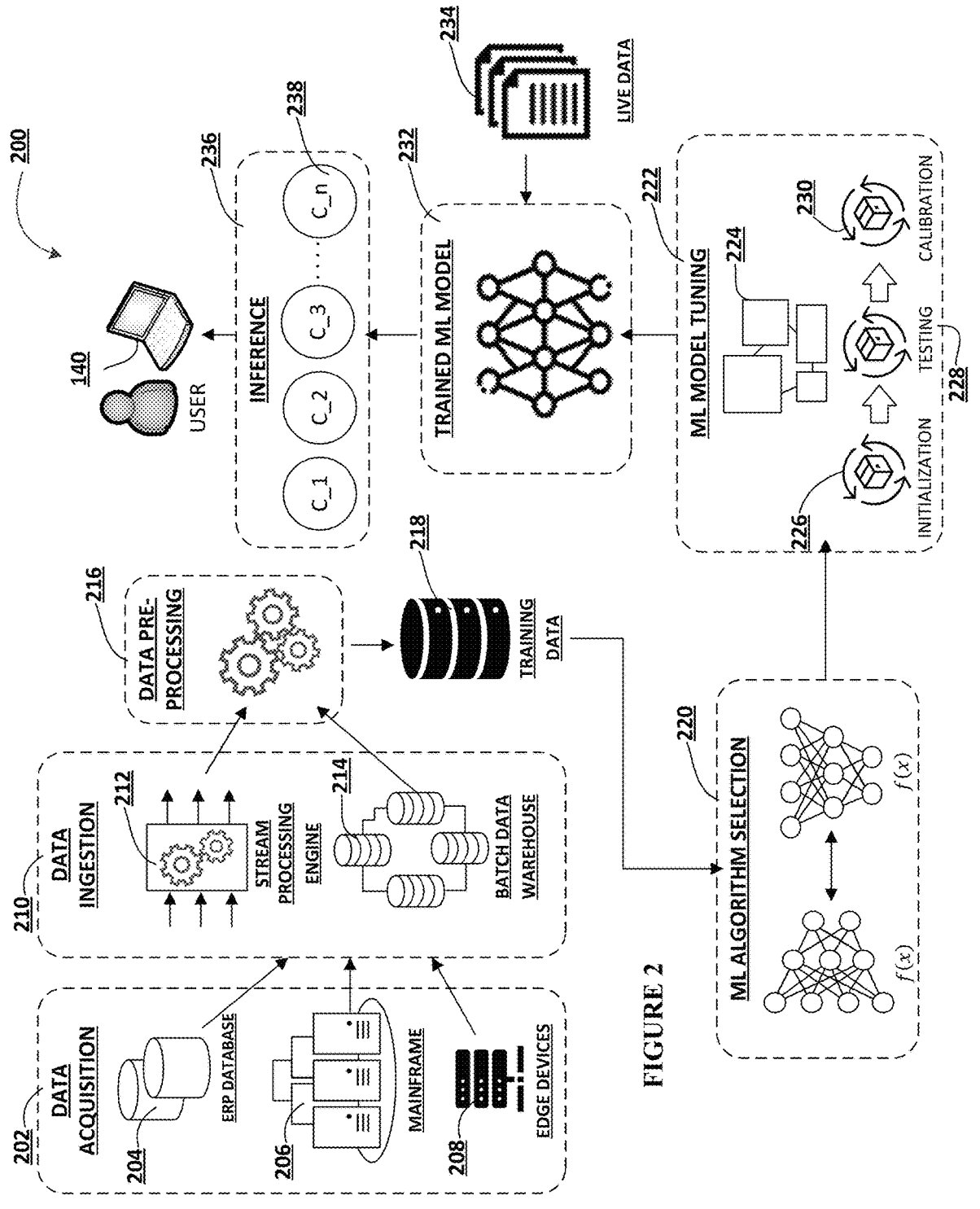
Figure 4A:
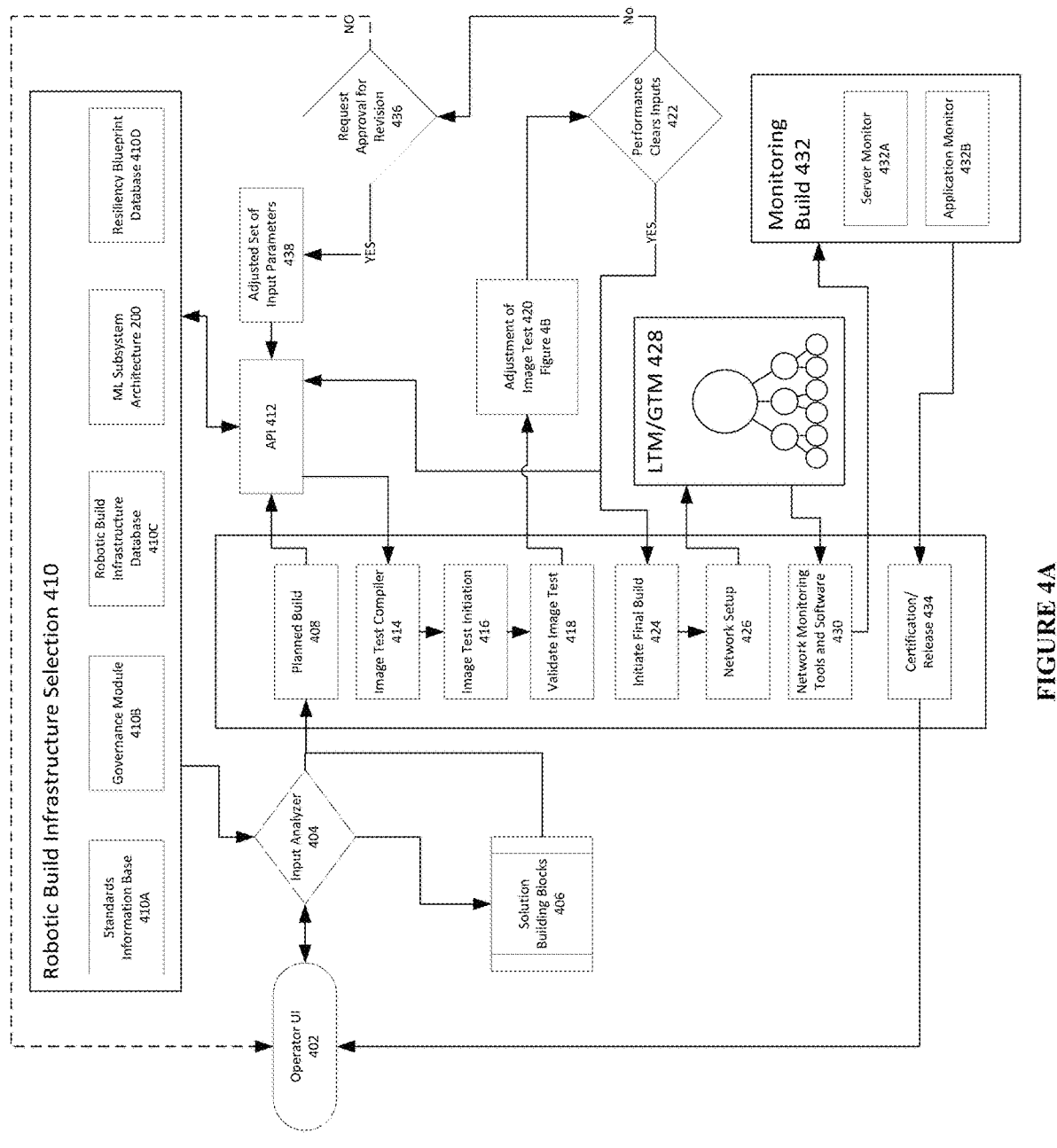
Figure 4B:
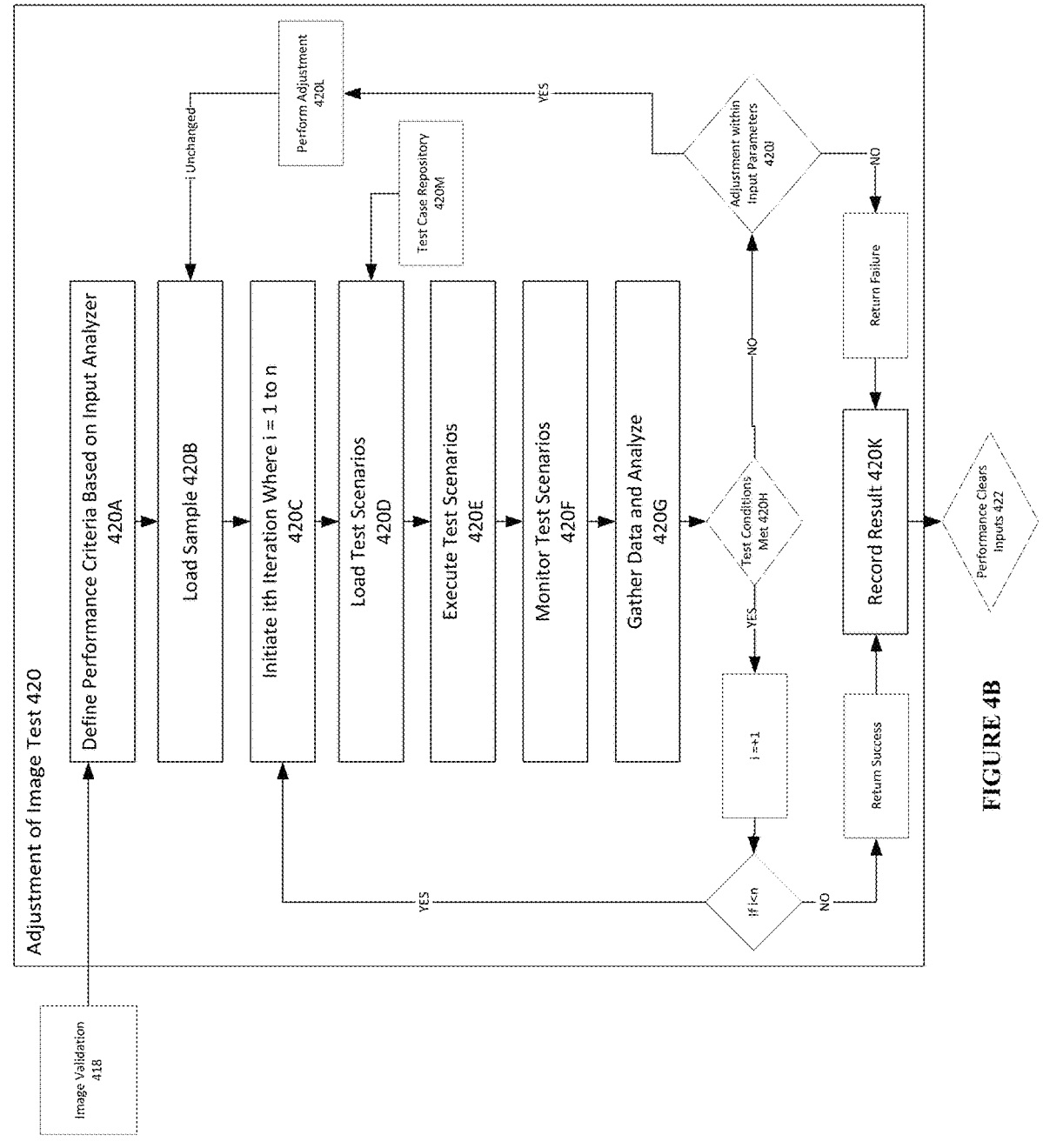

FIGS. 1A-1C illustrates technical components of an exemplary distributed computing environment for system and method for self-adjusting robotic build infrastructure for software application development in accordance with an embodiment of the disclosure;

FIG. 2 illustrates an exemplary machine learning (ML) subsystem architecture, in accordance with an embodiment of the disclosure;

FIG. 3 illustrates a process flow for self-adjusting robotic build infrastructure for software application development in accordance with an embodiment of the disclosure; and FIGS. 4A-4B illustrate an exemplary robotic build infrastructure selection and adjustment process in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, software applications that enable a plurality of communication or connectivity between applications or application components in a distributed network may be used in the installation of robotic build infrastructure. Said software, such as Middleware, may be used to provide a framework for running and managing complex robotic systems from a single unified interface. Said complex robotic systems may further include robotic build infrastructure.

As described herein, "machine learning" or "artificial intelligence" may be referred to as an advanced computational model for data analysis and automated decision making. Machine learning may be used throughout the selection and adjustment of robotic build infrastructure, as described in greater detail below.

Provisioning of new infrastructure, middleware servers for example, have previously been associated with repeated testing, adjustment, and tuning of the infrastructure before implementation. This provisioning, previously performed by human intervention, has encountered difficulties when performed at an adjusted scale than a scale previously encountered infrastructure.

The installation of new infrastructure, even when based off an automated build stemming from a factory model, has relied on extensive human intervention to properly plan, test, and implement. Infrastructure builds described as "one size fits all" may be adjusted, evaluated, and/or reconfigured based on a given environment. Further, such factory models may prove difficult to implement at varying scales, further complicating the provisioning and installation process.

Automatic adjustment of the new infrastructure enables provisioning of said infrastructure without human intervention. A factory model of the infrastructure can thus be scaled or adjusted to fit a given environment based on input parameters provided by a user. Adjustments to the factory model of the infrastructure may then be adjusted using a combination of machine learning and performance tests, the results of which may provide insights into the adjustment or alteration of the robotic build infrastructure. Adjustments made to the infrastructure may further be stored within a memory database, providing future templates in which infrastructure may be modeled after or similarly adjusted in a future infrastructure.

Accordingly, the present disclosure comprises self-adjusting provisioning of middleware robotic build infrastructure using machine learning and performance tests. A set of input parameters associated with a planned build are received and analyzed. From the analyzed input parameters, a robotic build infrastructure is selected using machine learning, the machine learning using the analyzed set of input parameters, standards for infrastructure, previously encountered infrastructure, and compliance guidelines. Once a robotic build infrastructure has been selected, an image test is compiled, which may be subjected to validation through a performance test, providing insight into the adjustments that may be made. The performance test may use the analyzed set of input parameters to define a set of performance criteria, which may be used to adjust the image test. Adjustments to the image test may be made within the confines of the input parameters; a request may be transmitted to the user interface if an adjustment outside of the input parameters is suggested. Upon adjustment of the image test, a final build may be initiated and certified. Adjustments made to the robotic build infrastructure may be stored within the build infrastructure database.

What is more, the present disclosure provides a technical solution to a technical problem. As described herein, the technical problem includes extensive human intervention to provision new robotic build infrastructure with multiple input parameters. The technical solution presented herein allows for self-adjusting robotic build infrastructure for software application development using a self-adjusting performance test, machine learning, and previously encountered infrastructure. In particular, self-adjusting robotic infrastructure for software application development is an improvement over existing solutions to extensive human intervention to provision new robotic build infrastructure, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for self-adjusting robotic build infrastructure for software application development 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates an exemplary machine learning (ML) subsystem architecture 200, in accordance with an embodiment of the invention. The machine learning subsystem 200 may include a data acquisition engine 202, data ingestion engine 210, data pre-processing engine 216, ML model tuning engine 222, and inference engine 236.

The data acquisition engine 202 may identify various internal and/or external data sources to generate, test, and/or integrate new features for training the machine learning model 224. These internal and/or external data sources 204, 206, and 208 may be initial locations where the data originates or where physical information is first digitized. The data acquisition engine 202 may identify the location of the data and describe connection characteristics for access and retrieval of data. In some embodiments, data is transported from each data source 204, 206, or 208 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 204, 206, and 208 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 202 from these data sources 204, 206, and 208 may then be transported to the data ingestion engine 210 for further processing.

Depending on the nature of the data imported from the data acquisition engine 202, the data ingestion engine 210 may move the data to a destination for storage or further analysis. Typically, the data imported from the data acquisition engine 202 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 202, the data may be ingested in real-time, using the stream processing engine 212, in batches using the batch data warehouse 214, or a combination of both. The stream processing engine 212 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 214 collects and transfers data in batches according to scheduled intervals, trigger events, or any other logical ordering.

In machine learning, the quality of data and the useful information that can be derived therefrom directly affects the ability of the machine learning model 224 to learn. The data pre-processing engine 216 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 216 may implement feature extraction and/or selection techniques to generate training data 218. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 218 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 222 may be used to train a machine learning model 224 using the training data 218 to make predictions or decisions without explicitly being programmed to do so. The machine learning model 224 represents what was learned by the selected machine learning algorithm 220 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 222 may repeatedly execute cycles of experimentation 226, testing 228, and tuning 230 to optimize the performance of the machine learning algorithm 220 and refine the results in preparation for deployment of those results for consumption or decision making. To this end, the ML model tuning engine 222 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 218. A fully trained machine learning model 232 is one whose hyperparameters are tuned and model accuracy maximized.

The trained machine learning model 232, similar to any other software application output, can be persisted to storage, file, memory, or application, or looped back into the processing component to be reprocessed. More often, the trained machine learning model 232 is deployed into an existing production environment to make practical business decisions based on live data 234. To this end, the machine learning subsystem 200 uses the inference engine 236 to make such decisions. The type of decision-making may depend upon the type of machine learning algorithm used. For example, machine learning models trained using supervised learning algorithms may be used to structure computations in terms of categorized outputs (e.g., $C\_1, C\_2 \ldots C\_n$ 238) or observations based on defined classifications, represent possible solutions to a decision based on certain conditions, model complex relationships between inputs and outputs to find patterns in data or capture a statistical structure among variables with unknown relationships, and/ or the like. On the other hand, machine learning models trained using unsupervised learning algorithms may be used to group (e.g., C_1, C_2 . . . C_n 238) live data 234 based on how similar they are to one another to solve exploratory challenges where little is known about the data, provide a description or label (e.g., C_1, C_2 . . . C_n 238) to live data 234, such as in classification, and/or the like. These categorized outputs, groups (clusters), or labels are then presented to the user input system 130. In still other cases, machine learning models that perform regression techniques may use live data 234 to predict or forecast continuous outcomes.

It will be understood that the embodiment of the machine learning subsystem 200 illustrated in FIG. 2 is exemplary and that other embodiments may vary. As another example, in some embodiments, the machine learning subsystem 200 may include more, fewer, or different components.

FIG. 3 illustrates a process flow 300 for self-adjusting robotic build infrastructure for software application development, in accordance with an embodiment of the disclosure. In some embodiments, a system and method for self-adjusting robotic build infrastructure for software application development (e.g., similar to one or more of the systems described herein with respect to FIGS. 1A-1C, 2, and 4A-4B) may perform one or more of the steps of process flow 300.

As shown in Block 302, the process flow 300 may include the step of receiving a set of input parameters associated with a planned build. The received set of input parameters may be transmitted from a user and/or entity through a user interface. The set of input parameters may be comprised of, but not limited to, types of middleware technology, connectivity requirements, standards associated with the planned build, model types, drive specifications, random access memory (RAM) standards/types, a range of concurrent users, projected loads, numbers of servers, abstract machine (a model of a computer system constructed to enable analysis of the operation of said computer system, i.e., java virtual machine) per server, interactions in a predetermined time (i.e., transactions per minute), types of interactions (i.e., type of transactions), number of CORES, load factors, and/or the like. The set of input parameters may further comprise measurements associated with energy, server health (i.e., standards of how a given server completes tasks in a predetermined time period), dimensions, areas, volumes, scale factors, quantifiable inputs, and/or the like. The set of input parameters may further comprise performance criteria of the planned build, such as standards which the planned build may operate at upon completion of the build. For instance, performance criteria within the set of input parameters may include transactions per minute during non-peak hours, transactions per minute during peak hours, number of concurrent users, a scenario ceiling, a scenario floor, a scenario point, a scenario median (median between the scenario floor and scenario ceiling), and a scenario tolerance.

The planned build may be comprised of placement of the robotic build infrastructure, operations associated with the robotic build infrastructure, functions of the robotic build infrastructure, and/or the like. In other words, the planned build may be the conditions in which the robotic build infrastructure may be constructed. For example, the planned build may be a specific model of robotic build infrastructure which may be planned to accommodate 3 concurrent users, be able to connect with a predetermined list of devices, perform a predetermined set of actions, have a predetermined amount of RAM, follow a given set of drive specifications, and the like.

In some embodiments, the received set of input parameters may be received through a web-based user interface. The set of input parameters may be provided, entered, or uploaded through a user input, interface, or connection. The received set of input parameters may be transferred from an external source such as a network, a wireless infrastructure, or the like. The set of input parameters received may be comprised of a plurality of parameters in a plurality of categories associated with the planned build.

As shown in Block 304, the process flow 300 may include the step of analyzing the set of input parameters associated with the planned build. Analysis of the set of input parameters associated with the planned build may include prioritizing components within the set of input parameters. For instance, if the set of input parameters included a connectivity requirements and energy consumption, the connectivity requirements included within the set of input parameters may be prioritized more than the energy consumption. The assignment of priority within the set of input parameters may be received as the set of input parameters are provided, or during analysis of the set of input parameters associated with the planned build. Priority of components may be predetermined depending on configurable settings.

In another embodiment, analysis of the set of input parameters associated with the planned build may include calculation/determination of factors associated with the planned build. For instance, if the set of input parameters includes the width, length, and type of robotic build infrastructure, but does not include the height, a plurality of suggested height dimensions may be provided based on the historical height of the type of robotic build infrastructure.

As shown in Block 306, the process flow 300 may include the step of determining a robotic build infrastructure from a robotic build infrastructure database using the analyzed set of input parameters associated with the planned build. Determining a robotic build infrastructure from the robotic build database may include comparing the analyzed set of input parameters against a standards information base, defining a set of compliance guidelines through a governance module, and comparing the analyzed set of input parameters against the robotic build infrastructure database. The comparisons and defined guidelines may be utilized by a plurality of advanced computational models for data analysis and automated decision making (such as the machine learning subsystem architecture 200 described in FIG. 2) to select and/or determine the robotic build infrastructure from the robotic build infrastructure database.

In some embodiments, the standards information base may include standards associated with the robotic build infrastructure, which may be comprised of technology standards, application standards, server health standards, server load capacity standards, and/or data standards. For instance, the set of input parameters may include a software parameter, wherein the robotic build infrastructure selected from the database is compatible with a given technology standard. The standards information base may serve as a source of input for further determination of the robotic build infrastructure based on the set of analyzed input parameters.

In some embodiments, determination of a robotic build infrastructure may include defining a set of compliance guidelines through a governance module. The defined set of compliance guidelines through a governance module may further be used to compare the analyzed set of input parameters against said compliance guidelines. Comparison against the governance module and the compliance guidelines within may include assessing the compliance of the robotic build infrastructure, measuring performance of the robotic build infrastructure, and assessing components within the robotic build infrastructure as defined in the governance module.

In some embodiments, determining a robotic build infrastructure from the robotic build database may include comparing the analyzed set of input parameters against the robotic build infrastructure database. Comparison between the analyzed set of input parameters and the robotic build infrastructure database may enable a robotic build infrastructure to be determined based on the similarity to the set of input parameters to a stored infrastructure within the database. The selected robotic build infrastructure may be used as the basis for compiling the image test, as described in greater detail below.

In some embodiments, the robotic build infrastructure database may include models, robotic build infrastructure, builds, previously used builds, previous adjustments to encountered builds, a record of historically used builds, and the like. The build infrastructure database may be divided into categories to match a robotic build infrastructure to the analyzed set of input parameters. For example, the build infrastructure may be divided into separate categories of robots in which a category of robotic build infrastructure may be selected. Upon selection of the category of robotic build, multiple sizes and scales of the category of robotic build infrastructure may be selected based off the analyzed input parameters.

In some embodiments, determining the robotic build infrastructure from the robotic build infrastructure database using the analyzed set of parameters may include using a plurality of advanced computational models for data analysis and automated decision making. The plurality of advanced computational models for data analysis and automated decision making may be a form of machine learning, self-learning, or artificial intelligence which may be capable of predicting probable robotic build infrastructure based on the set of input parameters. The plurality of advanced computational models for data analysis and automated decision making may be used to select a robotic build infrastructure from the robotic build database using the comparisons of the analyzed set of input parameters to the standards information database, the compliance guidelines defined through the governance module, and comparison to the robotic build infrastructure database. For instance, the analyzed set of input parameters may include drive specifications and model types which may be used by the plurality of advanced computational models for data analysis and automated decision making to determine the robotic build infrastructure based on similar previously encountered input parameters. Determined robotic build infrastructure may further be updated/adjusted based on the set of input parameters. The build infrastructure database may be updated to include adjusted, modified, or new versions of the robotic build infrastructure. Updates to the robotic build infrastructures may be added to the build infrastructure database as adjustments and new configurations are created and/or modified.

As shown in Block 308, the process flow 300 may include the step of compiling an image test of the planned build based on the robotic build infrastructure determined from the robotic build infrastructure database. The image test may be comprised of a representation of the planned build based on the selected robotic build infrastructure and analyzed set of input parameters. The image test may enable a projection or plan of how the robotic build infrastructure may be provisioned based on the analyzed set of input parameters and selected robotic build infrastructure. For instance, the selected robotic build infrastructure may be selected using the analyzed input parameters, and an image test may be generated to gain insight on how the selected robotic build infrastructure may interact with the predetermined area. The image test may be subjected to a plurality of tests (i.e., performance test) in which the image test may provide insight into how the infrastructure my perform in tested conditions. In other words, the set of input parameters enable the creation of a planned build, a robotic build infrastructure that matches the planned build is selected, an image test is based off the selected robotic build infrastructure, and the image test is assessed, tested, modified, and/or validated based on performance tests.

As shown in Block 310, the process flow 300 may include the step of validating the image test through a performance test. Validating the image test of the planned build based on the robotic build infrastructure may comprise using regressive validation on the compiled image test. Regressive validation may be used to analyze and reform the selected robotic build infrastructure. Validation of the image test through the performance test may be performed after initiation of the image test, as may be described in greater detail below.

As shown in Block 312, the process flow 300 may include the step of adjusting the image test based on the analyzed set of input parameters and the performance test validation. The image test may be adjusted through designated soft configuration adjustments within the image test. Said soft configuration adjustments may be predetermined components of the image test which may be able to be configured or adjusted within predefined limits. Adjustments/configurations may further be limited by the set of input parameters, which may constrain the adjustments. In another embodiment, soft configuration adjustments may be part of the robotic build infrastructure. For instance, a robotic build infrastructure in which the image test may be compiled from may have a predetermined list of components, parts, ranges, settings, and/or adjustable aspects of the robotic build infrastructure which may be adjusted.

In some embodiments, the performance test results may be analyzed to determine which parts, components, settings, or aspects of the image test may be adjusted. For instance, in an image test subjected to a performance test wherein response time is measured, a response time above the scenario ceiling may result in adjustments to components, settings, and/or aspects and elements of the image test that may be used in lowering the response time. Components, elements, settings, and/or aspects associated with the response time may be incrementally adjusted within the range set by the image test. The performance test results may further be compared to the analyzed set of input parameters and predetermined configuration of the robotic build infrastructure from which the image test was compiled from to determine which parts, components, elements, settings, or aspects of the image test may be adjusted.

In some embodiments, the performance test may be comprised of testing the compiled image based on defined performance criteria formed through the analysis of the input parameters. For example, the image test may be used to analyze the response time for a given transaction. The image test, compiled from the determined robotic build infrastructure, may be subjected to a plurality of transactions, and have the response time for each transaction measured. The response times may be compared against various input parameters such as the scenario floor, scenario ceiling, and the scenario tolerance. The number of transactions may be a range of values, said range may be between the projected transactions per minute during non-peak hours (TPM-nonpeak) to the number of transactions per minute during peak hours (TPM-peak).

In some embodiments, adjustment of the image test may further comprise loading test scenarios (i.e., examples of conditions, tests, and scenarios that may be experienced). Said test case scenarios may be designed by user input (i.e., test case scenarios may be entered as the set of input parameters) or may be stored in a test case repository (i.e., a repository of previous test case scenarios and/or test case scenarios previously associated with similar image tests). The test case scenarios may then be used to simulate conditions in which the image test may be assessed. Assessment/execution of the test case scenarios may be monitored to gather and analyze data, which in turn may be used to determine if a set of test conditions associated with the test case scenarios were met. If test conditions were met, the number of transactions may be increased with every iteration until the upper limit of the test range is reached (i.e., the first iteration is the TPM-nonpeak, which is increased by a predetermined value with each successful iteration until reaching the upper limit of the TPM-peak). If the test conditions are met and the upper limit of the range is reached, the image test has been validated and may proceed to the final build. If the test conditions are not met, the image test may be assessed to determine if a set of parameters within the image test may be adjusted. If the set of parameters within the image test may be adjusted, the adjustment may be made if the input parameters are not violated. If the set of parameters within the image test may not be adjusted, the image test has failed the performance test, and the robotic build infrastructure may be altered with approval of the user as described in greater detail below.

In some embodiments, adjustment of the image test may occur on a predetermined hierarchy, wherein the set of input parameters includes an order in which parts, components, settings, elements, and/or aspects of the image test may be adjusted. For instance, in an image test subjected to a performance test wherein response time is measured (as above), the input parameters and/or robotic build infrastructure from which the image test was compiled from may have a predetermined order in which the settings are adjusted for a response time above the scenario ceiling. This may include the adjustment of a first set of settings over a second set of settings, a change of first set of dimensions over a second set of dimensions, use of a second set of standards over a second set of standards, and the like.

In some embodiments, machine learning/artificial intelligence may be used to adjust the image test based on the performance test results. For instance, the results of the performance test may be analyzed as live data 234 as seen in FIG. 2. Machine learning (such as described in FIG. 2) may be used to determine which adjustments to the image test may be implemented and the degree to which they are adjusted. Adjustments from prior image tests and the results of which may be used to enable the machine learning to increase the accuracy of adjustments and perform fewer adjustments.

As shown in Block 314, the process flow may include initiating a final build of the robotic build infrastructure based on the adjusted image test. The initiation of the final build of the robotic build infrastructure may be the altered/ adjusted image test validated and adjusted through the performance test. The final build of the robotic build infrastructure may be stored within the build infrastructure database as a suggested input infrastructure for future builds. In other words, the image test was adjusted through the performance test, creating an adjusted robotic build infrastructure from the robotic build infrastructure determined from the robotic build infrastructure database. Initiation of the final build may comprise storage of the adjusted image test within the robotic build infrastructure database. Initiation of the final build may further be comprised of balancing local traffic management (LTM) and global traffic management (GTM).

As shown in Block 316, the process flow 300 may include the step of certifying the final build of the adjusted robotic build infrastructure. Certification of the final build may include monitoring the final build (for instance, monitoring a network, monitor, application, or elements within the robotic build infrastructure) in addition to performing product certification. Certification of the final build of the adjusted robotic build infrastructure may be comprised of verification of the final build on a predetermined set of standards, specifications, guidelines, and/or quality assurance tests the robotic build infrastructure may have undertaken through the creation, validation, and adjustment process described previously.

FIG. 4A illustrates an exemplary robotic build infrastructure installation process in accordance with an embodiment of the disclosure. As such, unless otherwise stated, the installation and selection process of FIGS. 4A-4B is capable of performing the operations shown in FIG. 3 and discussed herein. In some embodiments, selection of the robotic build infrastructure may use elements or parts of FIGS. 1A-IC and FIG. 2. FIG. 4A may be comprised of an operator user-interface 402, an input analyzer 404, solution building blocks 406, a planned build 408, a robotic build infrastructure selection 410, an application programming interface (API) 412, the image test compiler 414, the image test initiation 416, image test validation 418, adjustment of the image test 420, a performance clearance input 422, final build initiation 424, a network setup 426, local traffic management (LTM) and global traffic management (GTM) 428, network monitoring tools and software 430, monitoring build 432, certification/release 434, request approval for revision 436, and an adjusted set of input parameters 438.

The operator UI 402 may be used to enter the set of input parameters associated with the planned build. Said set of input parameters may be processed by the input analyzer 404, which may analyze the set of input parameters. The input analyzer 404 may be used in conjunction with the solution building blocks 406, which may be comprised of infrastructure as a service (IAAS), software as a service (SAAS), platform as a service (PAAS), and database as a service (DBAAS). The solutions building blocks 406 may further be used in the analysis and processing of the set of input parameters. Analysis of the set of input parameters may be comprised of prioritization of parameters, defining performance criteria, and/or setting standards of operation in which the planned build may operate. Upon analysis, the analyzed set of input parameters may be compressed into a planned build 408 before being subjected to the application program interface (API) 412.

Subjection of the analyzed set of input parameters by the API 412 may enable the analyzed set of input parameters to communicate, interact, and/or be processed by the robotic build infrastructure selection 410. The API 412 may be comprised of a set of definitions and protocols for building and integrating application software, thus the analyzed set of input parameters may be integrated for selection of the robotic build infrastructure 410.

The robotic build infrastructure selection 410 may be comprised of a standards information base 410A, a governance module 410B, a robotic build infrastructure database 410C, a resiliency blueprint database 410D, and an embodiment of the machine learning subsystem architecture 200 as seen in FIG. 2. The standards information base 410A may define the technology, application, and data standards in which the planned build 408 may comply in accordance with. Comparison of the analyzed set of input parameters associated with the planned build 408 against the standards information base 410A may serve as input for robotic build infrastructure development and as a basis for procurement of further information associated with the planned build 408. The governance module 410B may define compliance guidelines in which the planned build 408 may adhere to. For instance, the governance module 410B may use an analyzed set of input parameters to aid in the selection of the robotic build infrastructure. For example, if a set of input parameters that have prioritized a connectivity requirement above the drive specification (both of which were specified in the input parameters) and the connectivity requirement is not compatible with certain aspects of the drive specification, the compliance guidelines would narrow the robotic build infrastructure selections to ensure the connectivity requirement is implemented above the drive specifications unable to comply with the connectivity requirement. The robotic build infrastructure database 410C may be comprised of previously encountered, utilized, and/or adjusted robotic build infrastructures. In other words, the robotic build infrastructure database stores templates for which incoming planned builds may be compared to and modeled after. The resiliency blueprint database 410D may be used to predict probable architecture based on new input parameters. The resiliency blueprint database 410D may also serve as an input to refract or retune a robotic build infrastructure after adjustments have been performed. Using the components comprised within the robotic build infrastructure selection 410, a robotic build infrastructure from the robotic build infrastructure database 410C may be selected using the machine learning subsystem architecture 200, comparisons of the standards information base 410A, and the set of compliance guidelines defined by the governance module 410B.

Upon selection of the robotic build infrastructure, an image test may be compiled using the image test compiler 414. The image test be tested and modified, the results and adjustments of which may be used as live data 234 as seen in FIG. 2. Compiling the image test through the image test compiler 414 may be followed by the image test initiation 416, in which the performance test may be performed on the image test.

Validation of the image test 418 may comprise performing regressive validation on the image test. Said regressive validation may be performed to determine whether numerical results quantifying hypothesized relationship between variables are acceptable as descriptions of the image test. Upon validation of the image test, the image test may be transferred to the adjustment of the image test 420.

Turning now to FIG. 4B, an example adjustment process may be conducted on the image test based on the analyzed set of input parameters and the performance test initiated. Upon validation, the image test may have defined performance criteria based on the analyzed set of input parameters 420A. For instance, the performance criteria may include a range of transactions per minute that the robotic build infrastructure may be able to process. The performance criteria may then cause the image test to undertake a set of performance tests associated with testing the number of transactions per minute the image test may be able to process. Upon definition of the performance criteria, a sample may be loaded 420B as part of the initiation of the performance test. The loaded sample 420B may determine the variable which may be tested in the performance test, as described in greater detail below.

After the sample has been loaded, the performance test may be conducted on the image test. The performance test may further be comprised of iterations of testing as seen in 420C, wherein a variable may be created to test the image test through a plurality of conditions and scenarios. For instance, the variable may be set at values associated with the set of input parameters. I.e., the variable in an instance in which the number of transactions per minute is tested and the response time may be measured in response to the number of transactions. The variable may be set to a lower number of transactions per minute and gradually increased until the variable reaches the upper limit of expected transactions (i.e., the peak number of transactions).

As the variable is increased through iterations of performance tests, results from the performance test may be collected, compared, and analyzed to determine adjustments made to the image test that align with the set of input parameters. Suggested adjustments to the image test that may violate the set of input parameters may be recorded as a failure within the performance test. This failure may cause a suggested adjustment to be transmitted to the user interface, which may then prompt the user on whether a suggested adjustment that violates the input parameters may be implemented.

As the variable is set in 420C, a test scenario may be loaded, in which the sample may be tested. For instance, in the load sample 420B may be the number of transactions conducted per minute, the variable "i" is represented from base conditions (i.e., a lower number of transactions per minute) while the upper limit "n" may be the peak number of transactions per minute tested within the performance test. A stored test within the test case repository 420M may be used to load the test scenario 420D. The test case repository may be comprised of a plurality of performance tests in which the image test may be assessed. The test case repository 420M may be added to, updated, or otherwise altered as an increasing number of adjustments are performed. In this example, the response time may be measured in comparison to the number of transactions conducted per minute. Upon initiation of the iterations 420C, the test scenarios may be executed 420E. The execution of the test case scenarios 420E may test the iteration and monitor the results of the test case scenario. Monitoring the results of the test case scenario and/or the performance test may comprise analysis of the scenario floor, scenario ceiling, scenario point, scenario median, scenario tolerance, measurement of a dispersion cloud, measurement/analysis of the dispersion, and/or the application of mathematic and statistical analysis used to adjust the test case to align with the planned build. If the performance criteria defined in 420A are met, the iteration is increased (i.e., the variable "i" may increase by one). In this example, the number of transactions per minute is increased for a new iteration. This cycle may be repeated until the iteration number is equal to an upper limit or "peak number/value" set in 420C. If the test conditions set by the performance criteria are not met in a given iteration, adjustments to the image test may be made if they comply with the set of analyzed input parameters 420L. In this scenario, the iteration number will remain unchanged and the process of loading the sample 420B, loading the test scenario 420D, executing the test scenario 420E, monitoring the test scenarios 420F, and gather data and analysis from the test scenario 420G may proceed until the iteration number reaches the upper limit ("n").

If adjustments within the set of analyzed input parameters are unable to be performed in 420J, the recorded result of the performance test may be a failure, which may cause a reevaluation of the set of analyzed input parameters. If the adjustment of the image test 420 returns failure, the performance may not clear the input 422, which may cause the transmission of a request to an end user to revise the test image based on the test iteration results, as seen in 436 in FIG. 4A. The transmitted request may be a request to adjust the set of input parameters outside of the boundaries of the input parameters. If the end user declines modification of the input parameters, the process may be halted, and a new set of input parameters may need to be received by the operator UI 402. If the end user accepts the revisions to the test image based on the test iterations, the adjusted image test may be transferred to the API 412 for further processing. The adjustments/revisions to the test image may be recorded by the robotic build infrastructure selection 410 for future processing.

In some embodiments, wherein the iterations have met the performance criteria for all iterations (i.e., the test conditions were met in 420H for all iteration values), the recorded result 420K may be returned as a success, and the performance clears inputs 422 may be returned as yes. The successful image test may be transmitted to the API 412 which in turn may be added to the robotic build infrastructure selection 410/the robotic build infrastructure database 410C. In other words, the successful image test and the adjustments made to said image test may be recorded. Recording of the successful image test and the adjustments made may enable an increased accuracies and efficiency of the robotic build infrastructure selection 410 for future infrastructures. Success within the performance test may begin initiation of the final build 424.

Returning now to FIG. 4A, initiation of the final build 424 based on the adjusted image test may comprise initiation of a network script, prompting the setup of a network 426 and may further comprise balancing a local traffic management (LTM) and a global traffic management (GTM) 428. Network monitoring tools and software 430 may be implemented to monitor the build 432, which may be comprised of monitoring a server 432A and monitoring an application 432B within the final build. The final build may then undergo certification/release 434 to ensure performance aligns with the planned build before the final build is distributed to the end user.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for self-adjusting robotic build infrastructure for software application development, the system comprising:

a memory device with computer-readable program code stored thereon;

at least one processing device operatively coupled to the at least one memory device and the at least one communication device, wherein executing the computer-readable code is configured to cause the at least one processing device to:

receive a set of input parameters associated with a planned build;

analyze the set of input parameters associated with the planned build;

determine a robotic build infrastructure from a robotic build infrastructure database using the analyzed set of input parameters associated with the planned build;

compile an image test of the planned build based on the robotic build infrastructure determined from the robotic build infrastructure database;

validate the image test through a performance test;

adjust the image test based on the analyzed set of input parameters and the performance test validation;

initiate a final build of the robotic build infrastructure based on the adjusted image test; and certify the final build of the robotic build infrastructure.

2. The system of claim 1, wherein determination of the robotic build infrastructure from the robotic build infrastructure database further comprises:

compare the analyzed set of input parameters against a standards information base;

define a set of compliance guidelines through a governance module;

compare the analyzed set of input parameters against the robotic build infrastructure database; and select the robotic build infrastructure from the robotic build infrastructure database using a plurality of advanced computational models for data analysis and automated decision making, comparisons of the standards information base, and the set of compliance guidelines defined by the governance module.

3. The system of claim 1, wherein validating the image test comprises performing regressive validation on the image test.

4. The system of claim 1, wherein adjusting the image test comprises:

define a set of performance criteria based on the analyzed set of input parameters associated with the planned build;

load a test case scenario from a test case repository;

execute the test case scenario; and analyze the set of performance criteria resulting from the test case scenario.

5. The system of claim 4, wherein adjusting the image test further comprises:

transmit a request to an end user to revise the test image based on a test iteration;

revise the test image upon receipt of approval from the end user to revise the test image based on the test iteration; and generate an adjusted image test through a plurality of advanced computational models for data analysis and automated decision making.

6. The system of claim 1, wherein initiating a final build comprises storing the adjusted image test within the robotic build infrastructure database.

7. The system of claim 1, wherein initiating the final build comprises balancing a local traffic management (LTM) and a global traffic management (GTM).

8. A computer program product for self-adjusting robotic build infrastructure for software application development, the computer program product comprising at least one non-transitory computer-readable medium having computer-readable program code embodied therein, the computer-readable program code comprising instructions that, when executed by at least one processor, cause the processor to:

receive a set of input parameters associated with a planned build;

analyze the set of input parameters associated with the planned build;

determine a robotic build infrastructure from a robotic build infrastructure database using the analyzed set of input parameters associated with the planned build;

compile an image test of the planned build based on the robotic build infrastructure determined from the robotic build infrastructure database;

validate the image test through a performance test;

adjust the image test based on the set of analyzed input parameters and the performance test validation;

initiate a final build of the robotic build infrastructure based on the adjusted image test; and certify the final build of the robotic build infrastructure.

9. The computer program product of claim 8, wherein determination of the robotic build infrastructure from the robotic build infrastructure database further comprises:

compare the analyzed set of input parameters against a standards information base;

define a set of compliance guidelines through a governance module;

compare the analyzed set of input parameters against the robotic build infrastructure database; and select the robotic build infrastructure from the robotic build infrastructure database using a plurality of advanced computational models for data analysis and automated decision making, comparisons of the standards information base, and the set of compliance guidelines defined by the governance module.

10. The computer program product of claim 8, wherein validating the image test comprises performing regressive validation on the image test.

11. The computer program product of claim 8, wherein adjusting the image test comprises:

define a set of performance criteria based on the analyzed set of input parameters associated with the planned build;

load a test case scenario from a test case repository;

initiate the test case scenario; and analyze the set of performance criteria resulting from the test case scenario.

12. The computer program product of claim 11, wherein adjusting the image test further comprises:

transmit a request to an end user to revise the test image based on a test iteration;

revise the test image upon receipt of approval from the end user to revise the test image based on the test iteration; and generate an adjusted robotic build infrastructure through a plurality of advanced computational models for data analysis and automated decision making.

13. The computer program product of claim 8, wherein initiating a final build comprises storing the adjusted image test within the build infrastructure database.

14. The computer program product of claim 8, wherein initiating the final build comprises balancing a local traffic management (LTM) and a global traffic management (GTM).

15. A method for self-adjusting robotic build infrastructure for software application development, the method comprising:

receiving a set of input parameters associated with a planned build;

analyzing the set of input parameters associated with the planned build;

determining a robotic build infrastructure from a build infrastructure database using the analyzed set of input parameters associated with the planned build;

compiling an image test of the planned build based on the robotic build infrastructure determined from the robotic build infrastructure database;

validating the image test through a performance test;

adjusting the image test based on the set of input parameters and the performance test validation;

initiating a final build of the robotic build infrastructure based on the adjusted image test; and certifying the final build of the robotic build infrastructure.

16. The method of claim 15, wherein determining the robotic build infrastructure from the robotic build infrastructure database further comprises:

comparing the analyzed set of input parameters against a standards information base;

defining a set of compliance guidelines through a governance module;

comparing the analyzed set of input parameters against the robotic build infrastructure database; and selecting the robotic build infrastructure from the robotic build infrastructure database using a plurality of advanced computational models for data analysis and automated decision making, comparisons of the standards information base, and the set of compliance guidelines defined by the governance module.

17. The method of claim 15, wherein validating the image test comprises performing regressive validation on the image test.

18. The method of claim 15, wherein adjusting the image test comprises:

defining a set of performance criteria based on the analyzed set of input parameters associated with the planned build;

loading a test case scenario from a test case repository;

executing the test case scenario; and analyzing the set of performance criteria resulting from the test case scenario.

19. The method of claim 18, wherein adjusting the image test comprises:

transmitting a request to an end user to revise the test image based on a test iteration;

revising the test image upon receipt of approval from the end user to revise the test image based on the test iteration; and generating an adjusted robotic build infrastructure through a plurality of advanced computational models for data analysis and automated decision making.

20. The method of claim 15, wherein initiating a final build comprises storing the adjusted image test within the build infrastructure database.

\* \* \* \* \*